United States Patent [19]

Macbain

[11] Patent Number: 4,460,147
[45] Date of Patent: Jul. 17, 1984

[54] MOUNTING BRACKETS FOR SHELVES AND PANELS

[76] Inventor: Kathleen R. Macbain, Rte. 2, Box 82, Miller, Mo. 65707

[21] Appl. No.: 222,617

[22] Filed: Jan. 5, 1981

[51] Int. Cl.³ ............................................. F16M 13/00
[52] U.S. Cl. .................... 248/542; 248/243; 248/222.4
[58] Field of Search ............. 248/200, 542, 223.1, 248/222.4, 223.2, 243; 108/42, 108, 152; 52/582, 511

[56] References Cited

U.S. PATENT DOCUMENTS

| | | | |
|---|---|---|---|
| 325,696 | 9/1885 | Post ........................................ 108/111 |
| 617,164 | 1/1899 | Jewett ................................. 108/42 X |
| 813,501 | 2/1906 | Keil ...................................... 248/243 |
| 863,068 | 8/1907 | Huff ..................................... 248/243 |
| 2,088,320 | 7/1937 | De Vries . |
| 3,238,686 | 3/1966 | Pomeroy . |
| 3,265,344 | 8/1966 | Ornstein . |
| 3,270,995 | 9/1966 | Shears . |
| 3,311,073 | 3/1967 | Colledge . |
| 3,332,655 | 7/1967 | Van Buren, Jr. ............. 248/223.1 X |
| 3,432,134 | 3/1969 | Forschmidt ..................... 108/108 X |
| 3,731,956 | 5/1973 | Hanley . |
| 3,996,718 | 12/1976 | Welch .................................... 52/582 |
| 4,121,801 | 12/1978 | Kellogg .......................... 108/152 X |
| 4,190,221 | 2/1980 | Updike ........................ 248/222.4 X |

FOREIGN PATENT DOCUMENTS 221202 4/1959 Australia .......................... 248/222.4

*Primary Examiner*—Ramon S. Britts
*Assistant Examiner*—Sarah A. Lechok
*Attorney, Agent, or Firm*—Lowe, King, Price & Becker

[57] ABSTRACT

Brackets for mounting articles, such as shelves or panels, to a vertical wall or other supporting structure comprise first and second mutually orthogonal bracket portions to be secured, respectively, to the undersurfaces of the articles and to the walls. A keyhole shaped slot formed in one of the bracket portions enables the bracket to be conveniently coupled to a supporting screw anchored in the wall. The remaining bracket portion is secured to the undersurface of the shelf by screws or is coupled to a supporting screw by a keyhole shaped slot in the second bracket portion. Several different bracket embodiments enable systems of shelves or panels to be assembled by individuals having very little mechanical skill.

15 Claims, 20 Drawing Figures

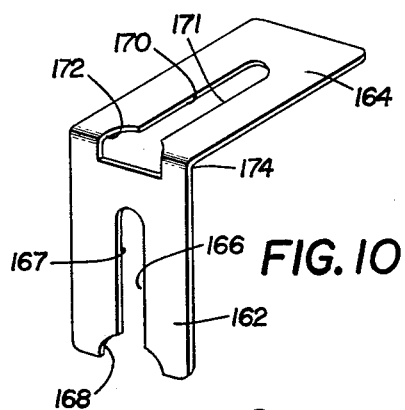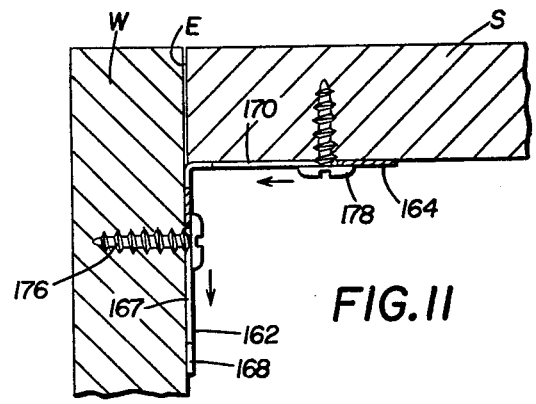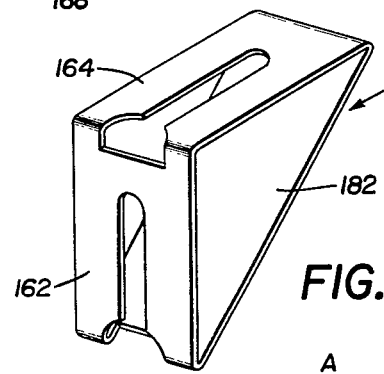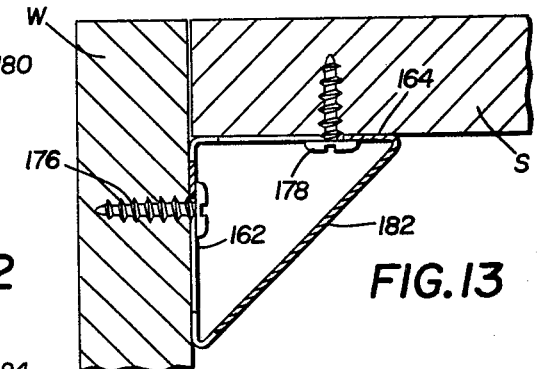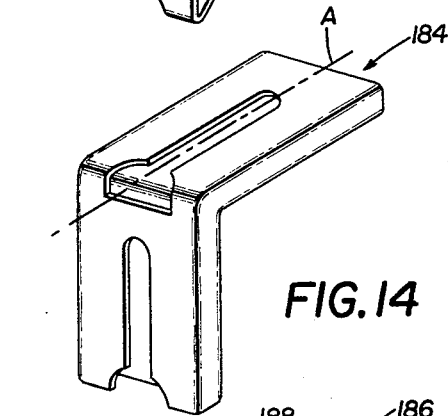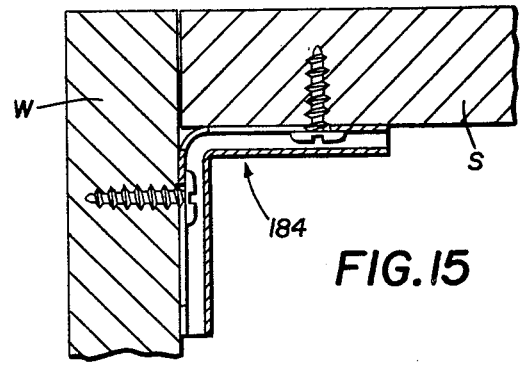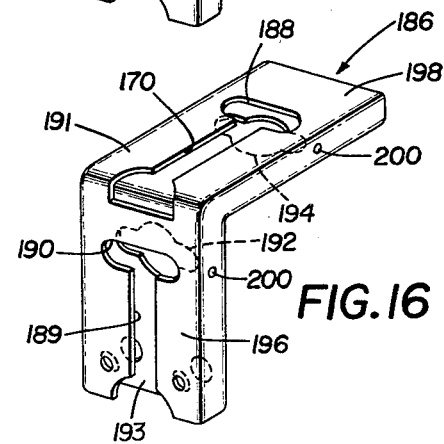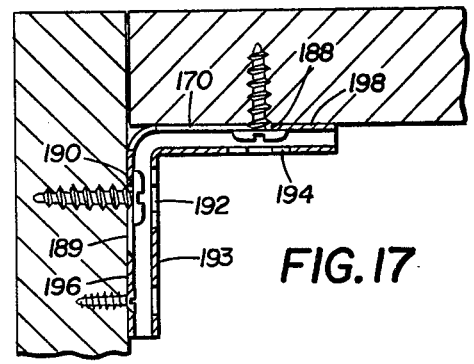

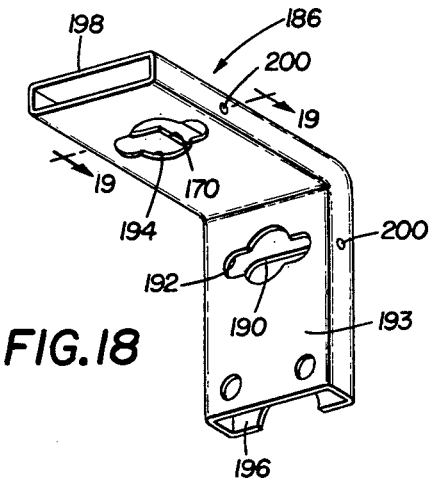
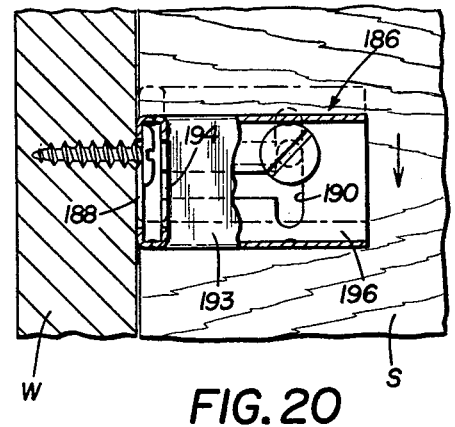
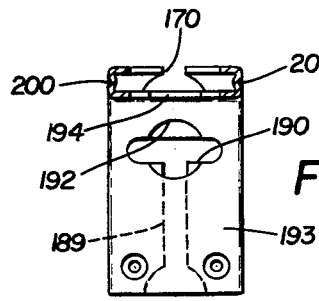

MOUNTING BRACKETS FOR SHELVES AND PANELS

TECHNICAL FIELD

The present invention relates generally to shelving or partition supporting brackets, and more particularly, toward such brackets that require very little mechanical skill and only a screwdriver for installation.

BACKGROUND ART

It is common practice to assemble shelves to a wall or bookcase frame using L-shaped brackets to be permanently secured respectively to the undersurfaces of the shelves and to the vertical supporting wall or other structure. These brackets, however, tend to require a considerable degree of mechanical skill on the part of the user to assemble shelving, storage units or other structures.

In Kellogg U.S. Pat. No. 4,121,801, for example, a shelf bracket comprises a nonmetallic, vertically oriented shelf supporting bracket upon which the shelf is seated, and a rear mounting bracket for anchoring the supporting bracket to a supporting surface. This bracket is relatively complex insofar as a two-piece bracket assembly is required, increasing cost and packaging requirements. Other shelf or panel supporting brackets that tend to be either relatively complex in structure or difficult to install are shown in the following patent Nos.:

Jewett; 617,164 Colledge; 3,322,073
Vries; 2,088,320 Van Buren, Jr.; 3,332,655
Pomeroy; 3,238,686 Forschmidt; 3,432,134
Ornstein; 3,265,344 Welch; 3,996,718
Shears; 3,270,995

One difficulty with providing convenient installation of the brackets of the type shown in these patents resides principally in aligning the brackets and shelving or partitions prior to assembly. In Jewett U.S. Pat. No. 617,164, for example, channel shaped brackets are positioned within an encasement to receive the opposite ends of shelving. Unless the brackets are very nearly precisely oriented within the window casing, however, it is almost impossible to slide the shelving between the brackets since there is a tendency for binding. As another difficulty, the brackets are typically secured to either the wall or the shelving or panelling with anils or screws so that the bracket is not easily disassembled from the wall and panelling or shelving during dismantling.

Accordingly, one object of this invention is to provide a system of shelving or partition support brackets that require minimum mechanical skill and no special tools for assembly.

Another object is to provide new and improved shelving or panelling brackets that do not require critical positioning on support structures and panels or shelving during assembly.

Still another object is to provide panel or shelving brackets that enable convenient disassembly of the brackets from walls or other supporting structures as well as from panels or shelving for dismantling.

An additional object is to provide shelving or panel brackets that are easy to manufacture and inexpensive.

Still another object is to provide shelving or partition brackets which together with appropriate lumber enable construction of stable, knock down type frame structures.

DISCLOSURE OF INVENTION

A bracket for mounting shelving, partitions, or other articles to a wall, stud, bookcase frame or other support member comprises, in accordance with a first embodiment of the invention, a first portion adapted to be secured to the article and a second portion formed with a keyhole shaped opening for mounting to a screw head extending from the support member. The first and second bracket portions are spaced apart from each other by a shoulder that is large enough to provide clearance to the screw head and thereby minimize alignment problems. The first bracket portion comprises a pair of coplanar, outwardly extending plates formed, respectively, at first and second shoulders at opposite ends of the second bracket portion. The keyhole shaped opening in the second bracket portion is oriented to extend longitudinally between the outwardly extending plate members.

In accordance with another embodiment of the invention, the first and second bracket portions are mutually orthogonal. The second bracket portion containing the keyhole opening is formed of two parallel sections offset from each other by a shoulder. The first bracket portion contains apertures for receiving screws to anchor the bracket to the undersurface or edge surface of the shelving or partition.

In accordance with still a further embodiment, the second bracket portion is formed with first and second, mutually orthogonal sections, and the keyhole opening is provided in the first section of the second bracket portion. The second section of the second bracket portion is parallel to the first section of the first bracket portion to "warp around" the end of a shelf or partition.

In another embodiment of the invention, the second bracket portion has an upper end that is turned downwardly toward the first bracket portion. The downturned end of the second bracket portion, coplanar with a shoulder formed at the intersection of the two portions, maintains the shelf or partition orthogonal to the support wall.

In accordance with a further embodiment of the invention, both of the first and second, mutually orthogonal bracket portions are provided with keyhole shaped openings. In the first bracket portion, the keyhole shaped opening is oriented with its enlarged portion located at the intersection of the two bracket portions. The enlarged portion of the second opening is positioned at an end of the second bracket portion opposite the intersection. As a modification, a third bracket portion may extend between the opposite ends of the first and second bracket portions forming a closed triangular configuration. The bracket may be formed of plate stock, or alternatively, may be cast into hollow stock having a rectangular cross section. In the latter case, the outer surfaces of the first and second bracket portions may be formed, respectively, with first and second keyhole shaped openings. Upper ends of the openings are "dog-eared" to enble latching to a screw. The inner surfaces of the first and second bracket portions may be formed with additional openings in registration respectively with at least one of the enlarged portions of the first and second keyhole shaped openings to enable viewing and tightening of a screw in the keyhole shaped opening from outside the bracket.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 10 is a perspective view of a supporting bracket in accordance with a fifth embodiment of the invention;

FIG. 11 is a cross sectional side view of the bracket of FIG. 10 mounted to a supporting wall and shelving or partition;

FIG. 12 is a perspective view of a supporting bracket in accordance with a sixth embodiment of the invention;

FIG. 13 is a cross sectional side view of the bracket of FIG. 12 mounted to a supporting wall and shelving or partition;

FIG. 14 is a perspective view of a supporting bracket in accordance with a seventh embodiment of the invention;

FIG. 15 is a cross sectional side view of the bracket of FIG. 14 mounted to a supporting wall and shelving or partition;

FIG. 16 is a perspective view of a supporting bracket in accordance with an eighth embodiment of the invention;

FIG. 17 is a cross sectional side view of the bracket of FIG. 16 mounted to a supporting wall and shelving or partition;

FIG. 18 is a rear perspective view of the bracket shown in FIG. 16;

FIG. 19 is an end view of the bracket of FIG. 16 viewed along the line 19—19 in FIG. 18; and FIG. 20 is a bottom view of the bracket of FIG. 16 showing how the bracket may be moved laterally for bracket locking.

BEST MODE FOR CARRYING OUT THE INVENTION

Figures 1, 2:
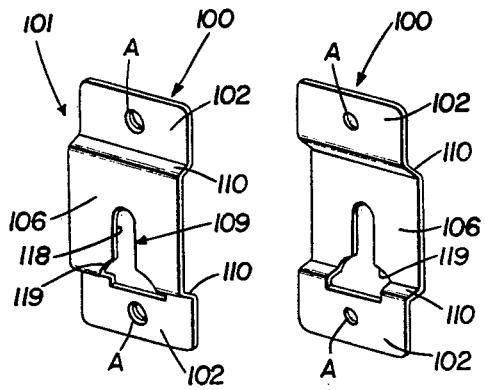
FIG. 1 is a front perspective view of a shelving or partition mounting bracket, in accordance with a first embodiment of the invention.
FIG. 2 is a rear perspective view of the bracket of FIG. 1.
Figure 3:
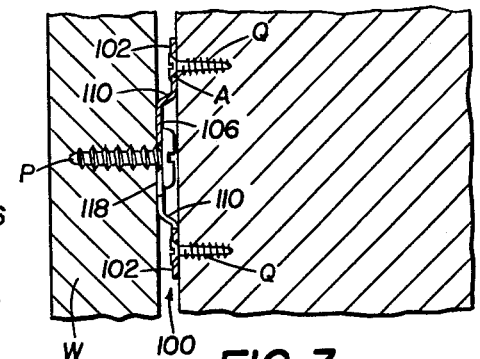
FIG. 3 is a cross sectional side view of the bracket shown in FIGS. 1 and 2 assembled to a supporting wall and shelving or partition.

Referring to FIGS. 1-3, a supporting bracket 100, in accordance with a first embodiment of the invention, comprises a first portion 101 adapted to be secured to partitions, vertical or horizontal shelves or other articles hereinafter termed "shelving" S and a second bracket portion 106 adapted to be coupled to a vertical supporting wall, stud or other support structure hereinafter termed "wall" W. The first bracket portion 101 is formed by a pair of outwardly extending plate members 102, 102 lying in a common plane displaced slightly from the plane of the second bracket portion 106 by shoulders 110, 110. The distance between the portions 101 and 106 established by shoulders 110, 110 is about equal to the height of the head of a screw P, as shown in FIG. 3. A pair of apertures A, A are formed in the plates 102, 102 for receiving mounting screws Q, Q adapted to anchor into the shelving S. The apertures A, A are preferably chamfered to receive the tapered heads of screws Q, Q.

A slot 118, formed in bracket portion 106 extends through one of the shoulders 110. The slot 118 is enlarged at the shoulder 110 and plate 102 to define a "keyhole" 109 to receive the head of anchor screw P for anchoring the bracket 110 to the supporting wall W.

In practice, the anchor screws P are secured within the supporting wall W at distances corresponding to the distances separating brackets 100 anchored to shelving S. The screws P are not tightened to the supporting wall W; the heads of screws P are spaced slightly from the surface of wall W by at least the thickness of brackets 100. The brackets 100 are then secured to shelving S at appropriate locations by screws Q. The shelving S is supported to the wall W by locating the enlarged portions 119 of slots 118 over the screw heads P and indexing the shelving S downwardly until the screws P are seated at the upper narrow portions of slots 118 of each of the brackets 100. The shelving S may thereafter be conveniently removed from supporting wall W by simply indexing the shelving upwardly to withdraw the screw heads P from the lower enlarged portions 119 of bracket slots 118.

Figure 4:
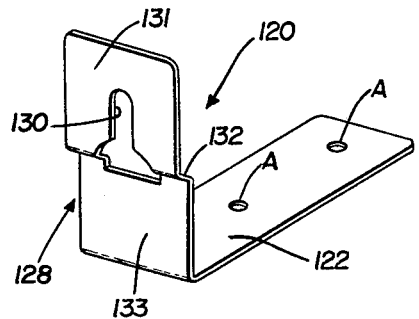
FIG. 4 is a perspective view of a bracket in accordance with a second embodiment of the invention.
Figure 5:
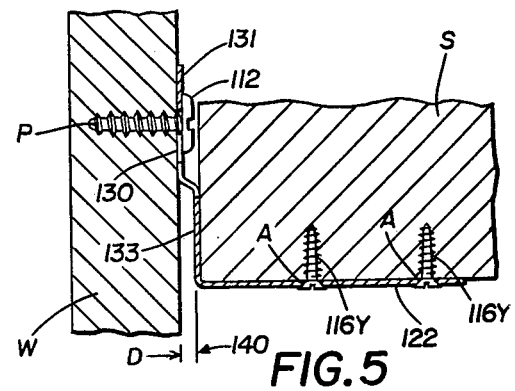
FIG. 5 is a cross sectional side view of the bracket of FIG. 4 mounted to a supporting wall and shelving or partition.

Referring to FIGS. 4 and 5, in accordance with another embodiment of the invention, a bracket 120 is formed with a first bracket portion 122 adapted to be secured to the undersurface of shelving S by screws Q extending through apertures A, A and a second bracket portion 128 orthogonal to the first bracket portion 122. The second bracket portion 128 is formed with a slot 130 having a generally keyhole shaped configuration corresponding to slot 118 in FIG. 1 and is formed of first and second sections 131, 133 offset from each other by a shoulder 132. The offset distance D (see FIG. 5) is slightly larger than the thickness of anchor screw P to provide clearnace.

In practice, the first bracket portion 122 is secured to the undersurface of shelving S using screws Q. Anchor screws P are then secured to wall W in the manner described with respect to the embodiment of FIGS. 1-3, with head of screw P offset from the wall surface by a distance at least as large as the thickness of the second bracket portion 128. The bracket 120 and shelving S are mounted to the screw head P as shown in FIG. 5, enabling the shelving S to be cantilevered outwardly from the support wall W.

Figure 6:
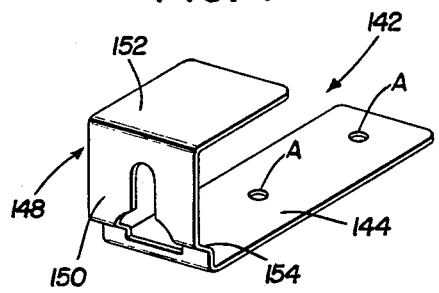
FIG. 6 is a perspective view of a supporting bracket in accordance with a third embodiment of the invention.
Figure 7:
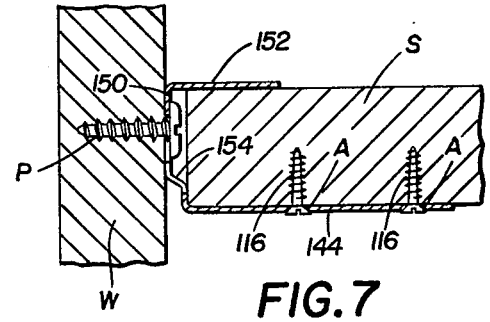
FIG. 7 is a cross sectional side view of the bracket shown in FIG. 6 mounted to a supporting wall and shelving or partition.

Referring now to FIG. 6, another embodiment of the invention comprises a bracket 142 having a first bracket portion 144 containing apertures A, A for receiving mounting screws Q, Q and a second bracket portion 148. The second bracket portion 148 comprises a first section 150 perpendicular to portion 144 and a second section 152 that is turned inwardly to be parallel with the first bracket portion 144. The first bracket portion 144 and second bracket portion 148 are formed to each other at a shoulder 154 that has a height (corresponding to D in FIG. 5) equal to the thickness of screw head P to provide clearance. Referring to FIG. 7, once installed, the upper section 152 of bracket 142 is positioned on the upper surface of a shelf 104 to provide a "wrap around" for additional stability to the cantilevered structure.

Figure 8:
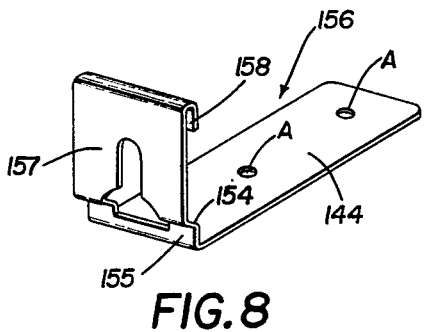
FIG. 8 is a perspective view of a bracket in accordance with a fourth embodiment of the invention.
Figure 9:
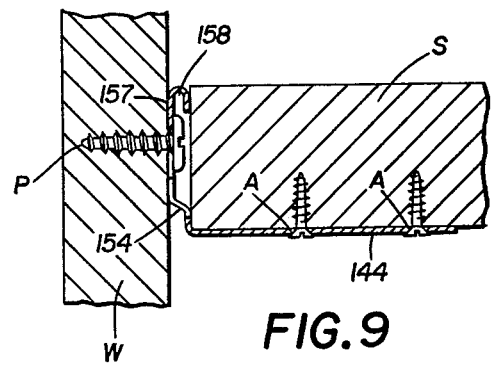
FIG. 9 is a cross sectional side view of the bracket shown in FIG. 4 mounted to a supporting wall and shelving or partition.

FIGS. 8 and 9 are directed toward another embodiment of the invention, wherein a bracket 156, similar to bracket 142 shown in FIG. 6, comprises a pair of mutual orthogonal bracket portions 155, 157. In bracket 156, however, upper end 158 is downturned to form an offset having a width corresponding to the width of shoulder 154. The offset 158 maintains shelving S spaced apart from and parallel to the surface of supporting wall W as well as spaced apart from the head of screw P.

Referring now to FIGS. 10 and 11, in accordance with another embodiment of the invention, bracket 160 comprises first and second, mutually orthogonal bracket portions 162 and 164. Bracket portion 162 is formed with a slot 166 having an upper, elongated region 167 and a lower, enlarged region 168 so that the slot generally has the configuration of a keyhole. The lower, enlarged portion of the slot 168 opens outwardly at the lower end of the bracket portion 162 to receive the head of a screw P for anchoring into wall W. Similarly formed in the bracket portion 164 is another generally keyhole shaped slot 170 having an enlarged lower portion 172 that extends through the corner 174 of the bracket 160 and slightly into the first bracket portion 162 to receive screw Q for anchoring to shelving S and also includes a narrow portion 171.

In practice, the bracket 160 is used to support a shelving S to a wall W by driving screws P and Q respectively into wall W and shelving S at appropriate locations. The heads of screws P and Q are slightly spaced apart from the wall W and shelf S by a distance that is slightly larger than the thickness of the bracket 160. The bracket 160 is assembled to the undersurface of shelving S by engaging the screw head Q into the enlarged portion 172 of slot 170 and sliding the bracket in the direction of the upper arrow (see FIG. 11) until the body of the screw contacts the closed end of the bracket slot and the bracket portion 162 is coplanar with the end E of the shelf S. The bracket 160, now secured to shelving S, is assembled to wall W by positioning the enlarged recess portion 168 of slot 166 over the screw P and indexing the bracket downwardly, as shown in FIG. 11, until the bracket is firmly seated on the screw and the shelf S is cantilevered outwardly from wall W. Screws P and Q are now tightened.

Another embodiment of the invention, shown in FIGS. 12 and 13, comprises a bracket 180 that is similar to bracket 160 in FIGS. 10 and 11 with the addition of a third bracket portion 182 extending between the first and second bracket portions 162 and 164 to form a closed triangular structure. As shown in FIG. 13, the additional section 182 of bracket 180 provides additional support to shelving S tending to help maintain the shelving under load orthogonal to supporting wall W.

FIGS. 14 and 15 illustrate another embodiment of the invention, wherein a bracket 184 is similar to bracket 160 in FIG. 10 except that the bracket 184 is formed of tubular stock which may be cast, that is, the bracket is hollow and has a rectangular cross section normal to axis A. The bracket 184 is installed in the manner described supra in connection with bracket 160. Because the bracket 184 has substantial structural rigidity due to its "tubular" configuration, the bracket may be formed of plastic or similar material.

Referring now to FIGS. 16 and 17, in accordance with another embodiment of the invention, a bracket 186 is similar to bracket 184 in FIG. 14, with enlarged portions 188 and 190 forming corresponding ends of slots 170 and 168 on outer wall 194. The openings 192, 194 enable access to the interior of the bracket 186 to expose and tighten screws P and Q during assembly.

Also formed in each of the two bracket portions 196 and 198 are raised embodiments 200. The raised embodiments help to properly locate the fingers of the user to apply pressure to the bracket side at the proper points to lock screws P, Q within slots 188, 190 during installation of the bracket.

Referring to FIGS. 18-20 which illustrate more clearly the structure of rear openings 192 and 194, it is to be pointed out that the elongated or "dog-eared" structure of the rear openings enables the bracket 186 to be indexed laterally, as shown in FIG. 20, to latch the bracket beneath the heads of screws P, Q during installation.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein. For example, it is to be understood that the "keyhole" openings within each bracket embodiment may have any suitable configuration adapted to receive a screw head and latch the head therein. As another example, anchor elements other than screws P, Q, such as nails, etc, could be used for assembly of virtually any shelving or cabinet systems or structures.

I claim:

1. A bracket for mounting an article to a support member, said bracket comprising a first portion to be secured to said article; and a second portion having a keyhole shaped opening formed therein large enough to receive a head of a fastener for mounting to said fastener extending from said support member, said first and second bracket portions being spaced apart from each other by shoulder means so as to lie in separate planes, said keyhole opening extending through said shoulder means between said first and second bracket portions and at least through a part of said second portion to establish a slot in the second portion, said slot tending to retain said fastener during application of a force to the fastener acting along a common longitudinal axis of the keyhole shaped opening and slot.

2. The bracket of claim 1, wherein said first bracket portion comprises a pair of coplanar, outwardly extending plate members formed, respectively, at first and second shoulders located at opposite ends of said second bracket portion, the longitudinal axis of said keyhole opening extending between said plate members, said slot being longitudinal and enclosed at one end thereof opposite the keyhole shaped opening.

3. The bracket of claim 1, wherein said second bracket portion is formed with first and second mutually orthogonal sections, said first section being parallel to said first bracket portion, the first bracket portion contacting the lower surface of the article, the first section contacting an upper surface of the article, said second section containing the keyhole shaped opening and adapted to be coupled to a fastener in the support member, the shoulder being located between said second section and said first portion to provide clearance to recline the head of said fastener.

4. The bracket of claim 1, wherein said second bracket portion is formed with first and second parallel sections, said keyhole opening being provided in said first section of said second bracket portion, said second section of said second bracket portion being offset from said first section by a shoulder to provide clearance for the head of a fastener.

5. The bracket of claim 4, wherein an outer end of said second section is turned inwardly toward said first bracket portion, said second section being coplanar with the shoulder formed adjacent the first bracket portion.

6. A bracket for mounting an article to a support member, comprising first and second mutually orthogonal bracket portions, said first portion having formed therein a first keyhole shaped opening, an enlarged portion of said first keyhole shaped opening being formed at an intersection of said first and second bracket portions, said second bracket portion having formed therein a second keyhole shaped opening, an enlarged portion of said second keyhole shaped opening being positioned at an end of said second bracket portion opposite said intersection.

7. The bracket of claim 6, including a third bracket portion extending between opposite ends of said first and second bracket portions.

8. The bracket of claim 6 or claim 7, wherein said first and second bracket portions are formed of plate members.

9. The bracket of claim 6, wherein said first and second bracket portions are formed of hollow material having a rectangular cross section for increased strength.

10. The bracket of claim 9, wherein outer surfaces of said first and second bracket portions respectively adapted to contact an article and a support member are formed, with said first and second keyhole openings.

11. The bracket of claim 10, wherein enlarged portions are formed on at least one of opposite ends of said first and second keyhole shaped openings to enable latching with a fastener head.

12. The bracket of claim 11, wherein openings are formed on inner surfaces of said first and second bracket portions in registration respectively with one of said enlarged portions of each of said first and second keyhole shaped openings.

13. The bracket of claim 12, further including finger embodiments located on opposite sides of said bracket positioned adjacent said enlarged portions for visually locating fastener means thereat.

14. The bracket of claim 6, wherein said first and second keyholes each communicate with slot means respectively formed in said first and second bracket portions, each one of said slot means being enclosed at an end thereof opposite the associated keyhole.

15. A bracket for drop mounting an article to a support member, comprising:
a bracket body having first and second portions joined together by a shoulder means oblique to said first and second portions, said shoulder means being formed with a keyhold shaped opening extending through said shoulder means into a part of said first bracket portion, sidewalls of said keyhole in said shoulder means being non-parallel and extending into the first bracket portion to establish a slot closed at an end opposite the shoulder means to retain a fastener received in the slot during application of a force acting along a longitudinal axis of the slot.

* * * * *